(12) United States Patent
Vankayala et al.

(10) Patent No.: US 12,015,479 B2
(45) Date of Patent: Jun. 18, 2024

(54) METHOD AND APPARATUS TO DECODE PACKETS TO COMPUTE LOG LIKELIHOOD RATIO IN WIRELESS NETWORK

(71) Applicant: Samsung Electronics Co., Ltd., Suwon-si (KR)

(72) Inventors: Satya Kumar Vankayala, Bangalore (IN); Seungil Yoon, Suwon-si (KR); Issaac Kommineni, Bangalore (IN); Venkateswarlu Yarramala, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 17/747,485

(22) Filed: May 18, 2022

(65) Prior Publication Data

US 2022/0278769 A1 Sep. 1, 2022

Related U.S. Application Data

(63) Continuation of application No. PCT/KR2020/016477, filed on Nov. 20, 2020.

(30) Foreign Application Priority Data

Nov. 22, 2019 (IN) ............................. 201941047746
Aug. 3, 2020 (IN) ............................. 202041033240
Nov. 17, 2020 (IN) ............................. 2019 41047746

(51) Int. Cl.
*H04L 1/00* (2006.01)
*G06F 18/214* (2023.01)
*G06N 3/04* (2023.01)

(52) U.S. Cl.
CPC .......... *H04L 1/0026* (2013.01); *G06F 18/214* (2023.01); *G06N 3/04* (2013.01); *H04L 1/0017* (2013.01); *H04L 1/005* (2013.01)

(58) Field of Classification Search
CPC ..... H04L 1/0026; H04L 1/0017; H04L 1/005; H04L 25/067; H04L 1/0045; H04L 27/38;
(Continued)

(56) References Cited

U.S. PATENT DOCUMENTS 7,586,991 B2 9/2009 Choi
8,019,024 B2 9/2011 Guerrieri et al.
(Continued)

FOREIGN PATENT DOCUMENTS

CN 110278001 A 9/2019
EP 3 468 080 A1 4/2019
(Continued)

OTHER PUBLICATIONS

Arvinte et al., 'Deep Log-Likelihood Ratio Quantization', In: 2019 27th European Signal Processing Conference (EUSIPCO), sections 2-5; and figure 2, Nov. 18, 2019.
(Continued)

*Primary Examiner* — Guy J Lamarre
*Assistant Examiner* — Osman M Alshack
(74) *Attorney, Agent, or Firm* — Jefferson IP Law, LLP

(57) ABSTRACT

A method for decoding user data by an apparatus in a wireless network is provided. The method includes receiving, by the apparatus, user data associated with a plurality of network parameters. The method includes training, by the apparatus, a neural network using the plurality of received network parameters. Further, the method includes computing, by the apparatus, a Log Likelihood Ratio (LLR) using the trained neural network. Further, the method includes decoding, by the apparatus, the received user data using the computed LLR.

16 Claims, 10 Drawing Sheets

(58) Field of Classification Search
CPC ........ G06F 18/214; G06N 3/04; G06N 3/044;
G06N 3/045; G06N 3/048; G06N 3/08;
H04B 7/0413
USPC .......................................................... 714/746
See application file for complete search history.

(56) References Cited

U.S. PATENT DOCUMENTS

| | | | |
|---|---|---|---|
| 8,301,979 | B2 | 10/2012 | Sharon et al. |
| 8,793,560 | B2 | 7/2014 | Sidi et al. |
| 10,447,353 | B2 | 10/2019 | Yufit et al. |
| 2017/0126360 | A1 | 5/2017 | Millar et al. |
| 2018/0276069 | A1 | 9/2018 | Takayama |
| 2019/0319658 | A1* | 10/2019 | Calabro .................. H04B 1/04 |
| 2021/0110241 | A1* | 4/2021 | Tullberg ................ G06N 3/047 |
| 2021/0142158 | A1* | 5/2021 | Agrawal ................ G06N 3/044 |
| 2021/0352705 | A1* | 11/2021 | Kang ..................... H04W 72/23 |
| 2022/0077957 | A1* | 3/2022 | Jeon .................... H03M 13/1125 |
| 2022/0278755 | A1* | 9/2022 | Lee ........................ G06N 3/049 |
| 2022/0385406 | A1* | 12/2022 | Lee ..................... H04L 25/0204 |

FOREIGN PATENT DOCUMENTS

| | | | |
|---|---|---|---|
| WO | 2007/105925 | A1 | 9/2007 |
| WO | 2018/235050 | A1 | 12/2018 |
| WO | 2019/038693 | A1 | 2/2019 |

OTHER PUBLICATIONS

Abeta et al., 'O-RAN Alliance Standardization Trends', In: NTT DOCOMO Technical Journal vol. 21 No. 1, sections 3.1-3.2; and figure 3, Jul. 2019.

Nishikawa et al., 'A Study on Iterative Decoding With LLR Modulator by Neural Network Using Adjacent Track Information in SMR System', In: IEEE Transactions on Magnetics (vol. 55, Issue: 12, Dec. 2019), section 3; and figure 3, Nov. 15, 2019.

Indian Office Action dated Jan. 19, 2022, issued in Indian Application No. 201941047746.

International Search Report dated Feb. 23, 2021 issued in International Application No. PCT/KR2020/016477.

Shental et al., "Machine LLRning': Learning to Softly Demodulate", arxiv.org, Cornell University Library, 201 Olin Library Cornell University Ithaca, NY 14853, XP081388703.

He et al., "Robust BICM Design for the LDPC Coded DCO-OFDM: A Deep Learning Approach", IEEE Transactions on Communications, IEEE Service Center, Piscataway, NJ. USA, vol. 68, No. 2, pp. 713-727, XP011772937, ISSN: 0090-6778, 001: 10.11 09ITCOMM. 2019.2954399.

Honkala et al., "DeepRx: Fully Convolutional Deep Learning Receiver", arxiv.org, Cornell University Library, 201 Olin Library Cornell University Ithaca, NY 14853, XP081658750.

European Search Report dated Nov. 11, 2022, issued in European Application No. 20888991.5.

* cited by examiner

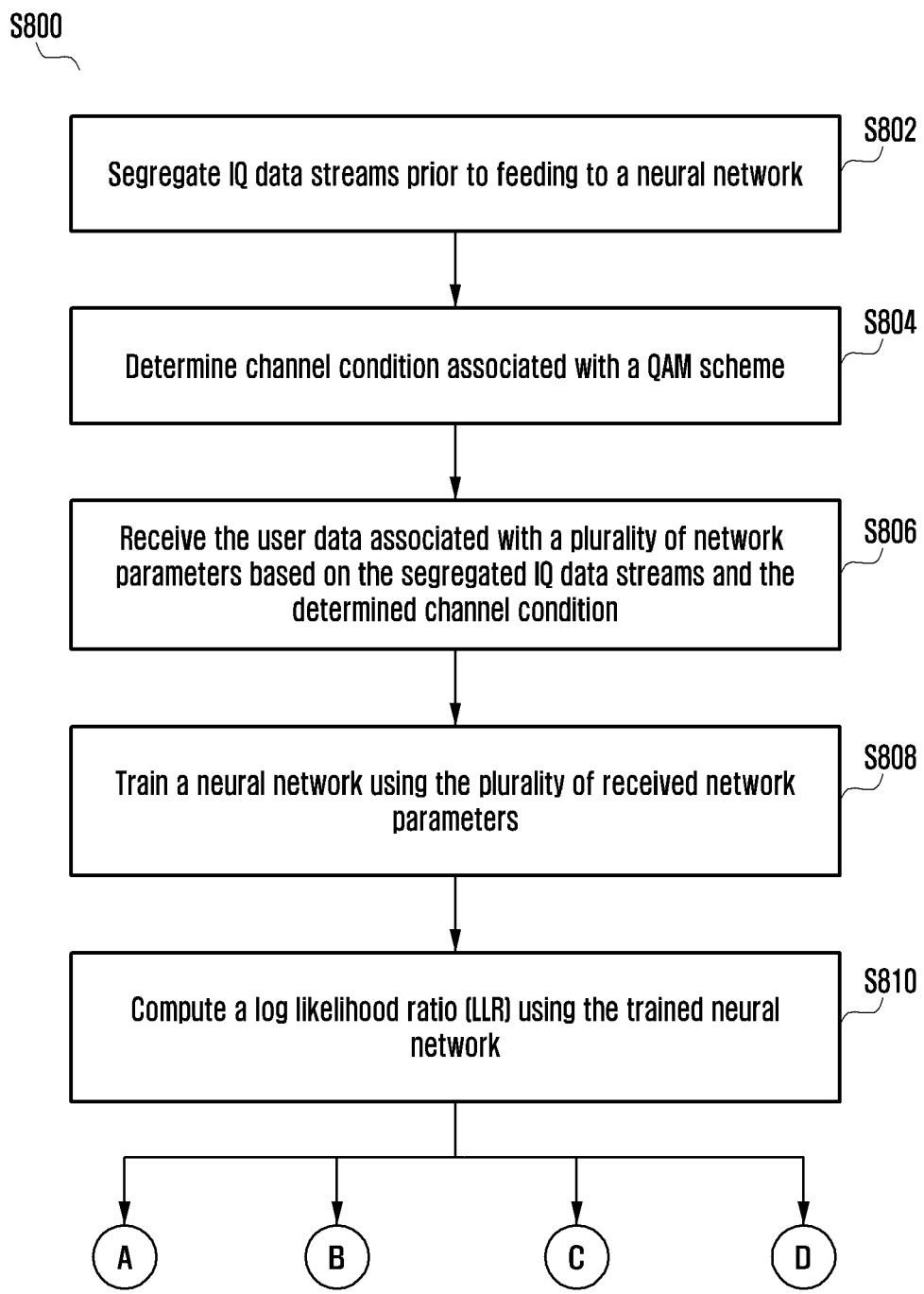

METHOD AND APPARATUS TO DECODE PACKETS TO COMPUTE LOG LIKELIHOOD RATIO IN WIRELESS NETWORK

CROSS-REFERENCE TO RELATED APPLICATION(S)

This application is a continuation application, claiming priority under § 365(c), of an International application No. PCT/KR2020/016477, filed on Nov. 20, 2020, which is based on and claims the benefit of an Indian provisional patent application number 201941047746, filed on Nov. 22, 2019, in the Indian Patent Office, of an Indian provisional patent application number 202041033240, filed on Aug. 3, 2020, in the Indian Patent Office, and of an Indian complete patent application number 201941047746, filed on Nov. 17, 2020, in the Indian Patent Office, the disclosure of each of which is incorporated by reference herein in its entirety.

BACKGROUND

1. Field

The disclosure relates to a wireless network. More particularly, the disclosure relates to a method and apparatus for decoding packets to compute a Log Likelihood Ratio (LLR) for Graphics Processing Unit (GPU)/Non-GPU based architecture in the wireless network.

2. Description of Related Art

In general, an LLR computation is an integral part of all kinds of wireless receivers. The LLR values are used as an input to decoding modules in the wireless receivers. However, computing LLR optimally has an exponential overhead. Therefore, several attempts have been made to simplify a process of the LLR computation. The existing methods are extremely complex and a high computational complexity will reduce the efficiency.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method to decode packets to compute Log Likelihood Ratio (LLR) values for computation unit based architectures (e.g., Graphics Processing Unit (GPU) based architectures, Non-GPU based architectures, central processing unit (CPU) based architectures, Non-CPU based architectures or the like) in a wireless network using machine learning techniques.

Another aspect of the disclosure is to provide a method for decoding user data by an apparatus in a wireless network. The method includes receiving, by the apparatus, user data associated with a plurality of network parameters. The method includes training, by the apparatus, a neural network using the plurality of received network parameters. Further, the method includes computing, by the apparatus, an LLR using the trained neural network. Further, the method includes decoding, by the apparatus, the received user data using the computed LLR.

Additional aspects will be set forth in part in the description which follows and, in part, will be apparent from the description, or may be learned by practice of the presented embodiments.

In an embodiment, the plurality of network parameters includes a Minimum Mean Square Error (MMSE) value, channel gains, a modulation scheme, a Channel Quality Indicator (CQI) information, a number of a User Equipment (UE) in range, a location of a UE, a distance of a UE from the apparatus, a weather condition, resource block (RB) information, operating frequency, RB bandwidth, a Quality of Service (QoS), a QoS Class Identifier (QCI), bandwidth part (BWP), Subcarrier Spacing (SCS), Coherence bandwidth (BW), a coherence time, a coherence interference, noise, operating frequency, a capability of the UE, a Multiple Input Multiple Output (MIMO) capability, a transmission mode, a real time traffic data, remote radio head (RRH) base station (BS) capabilities, in-phase data and quadrature data (I and Q) values of the UE, Quadrature Amplitude Modulation (QAM) modulation details, a size of in-phase data and quadrature data (I and Q) vector, and allocated Resource Blocks to an user, a density of traffic associated with the BS, a distribution of traffic associated with the BS, a category of the BS, climate conditions of present day, information of special occasions on the present day associated with an area of the UE, an event based calendar of the UE, a vacation details of a user associated with the UE, a category of the UE, and subscription details of the UE.

In an embodiment, decoding, by the apparatus, of the received user data using the computed LLR includes performing one of: I) transferring, by the apparatus, the computed LLR to a physical layer using an E2 interface, and decoding, by the apparatus, the received user data using the computed LLR, II) receiving, by the apparatus, a size of a user data vector, QAM information, MIMO rank details, and a number of resource blocks (RBs) assigned to the user data sequentially, and serially decoding, by the apparatus, the received user data on a per packet basis using the computed LLR based on the size of the user data vector, the QAM information, the number of the RBs assigned to the user data sequentially and the MIMO rank details, III) receiving, by the apparatus, QAM information, a size of IQ data of each user data, and allocated RBs to each user data, and parallel decoding, by the apparatus, the received user data per symbol basic using the computed LLR based on the QAM information, the size of IQ data of the each user data, and allocated RBs to each user data, and IV) providing, by the apparatus, the user data until all IQ data is decoded sequentially or parallel, assigning, by the apparatus, a size of an input vector as a function of number of RBs to the user data, loading, by the apparatus, a weight using a lookup table in the neural network, and sequentially decoding, by the apparatus, the user data using the computed LLR, the size of the input vector and the weight function. The LLR is computed for at least one of all packets, each bit serially, all user data, one bit at a time, and one bit at a time and for all user data at once.

In an embodiment, receiving, by the apparatus, the user data associated with the plurality of network parameters includes segregating, by the apparatus, IQ data streams prior to feeding to a neural network, determining, by the apparatus, channel condition associated with a QAM scheme, and receiving, by the apparatus, the user data associated with the plurality of network parameters based on the segregated IQ data streams and the determined channel condition.

In an embodiment, the neural network is trained by creating multiple batches of training samples, wherein each training sample uses at least one modulation scheme, training QAM schemes, wherein each QAM scheme comprises a unique code embedded in the user data, generating shuffled training samples for each batch from multiple batches, computing LLR corresponding to each shuffled training samples, and shuffling the calculated LLR across the batches while training.

In an embodiment, the apparatus is at least one of a base station, an Open Radio Access Network (ORAN), a centralized Radio Access Network (CRAN), and a virtual Radio Access Network (VRAN).

In an embodiment, the Neural Network (NN) is implemented in a radio access network (RAN) intelligent controller (RIC) module of an O-RAN and a VRAN.

In an embodiment, the computing, by the apparatus, the LLR comprises receiving at least one of a number of RBs, an operating frequency, a modulation and coding scheme (MCS), a number of independent streams, MIMO details, network and UE parameters from all the layers or sub-set of the network parameters and a signal to interference and noise ratio (SINR), and sequentially or parallel computing the LLR based on the at least one of the number of RBs, the operating frequency, the MCS, the number of independent streams, the MIMO details, the network and UE parameters from all the layers or sub-set of the network parameters and the SINR.

In accordance with an aspect of the disclosure, an apparatus for decoding user data in a wireless network is provided. The apparatus includes a processor coupled with a memory. The processor is configured to receive the user data associated with a plurality of network parameters and train a neural network using the plurality of received network parameters. Further, the processor is configured to compute an LLR using the trained neural network. Further, the processor is configured to decode the received user data using the computed LLR.

Other aspects, advantages, and salient features of the disclosure will become apparent to those skilled in the art from the following detailed description, which, taken in conjunction with the annexed drawings, discloses various embodiments of the disclosure.

The various embodiments of the disclosure may provide a method to decode packets to compute LLR values for computation unit based architectures (e.g., Graphics Processing Unit (GPU) based architectures, Non-GPU based architectures, central processing unit (CPU) based architectures, Non-CPU based architectures or the like) in a wireless network using machine learning techniques. This results in increasing the efficiency and reducing the high computational complexity.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A, 8B, and 8C are flow charts illustrating a method for decoding the user data by the apparatus in the wireless network, according to various embodiments of the disclosure.

The same reference numerals are used to represent the same elements throughout the drawings.

DETAILED DESCRIPTION

Figure 1:
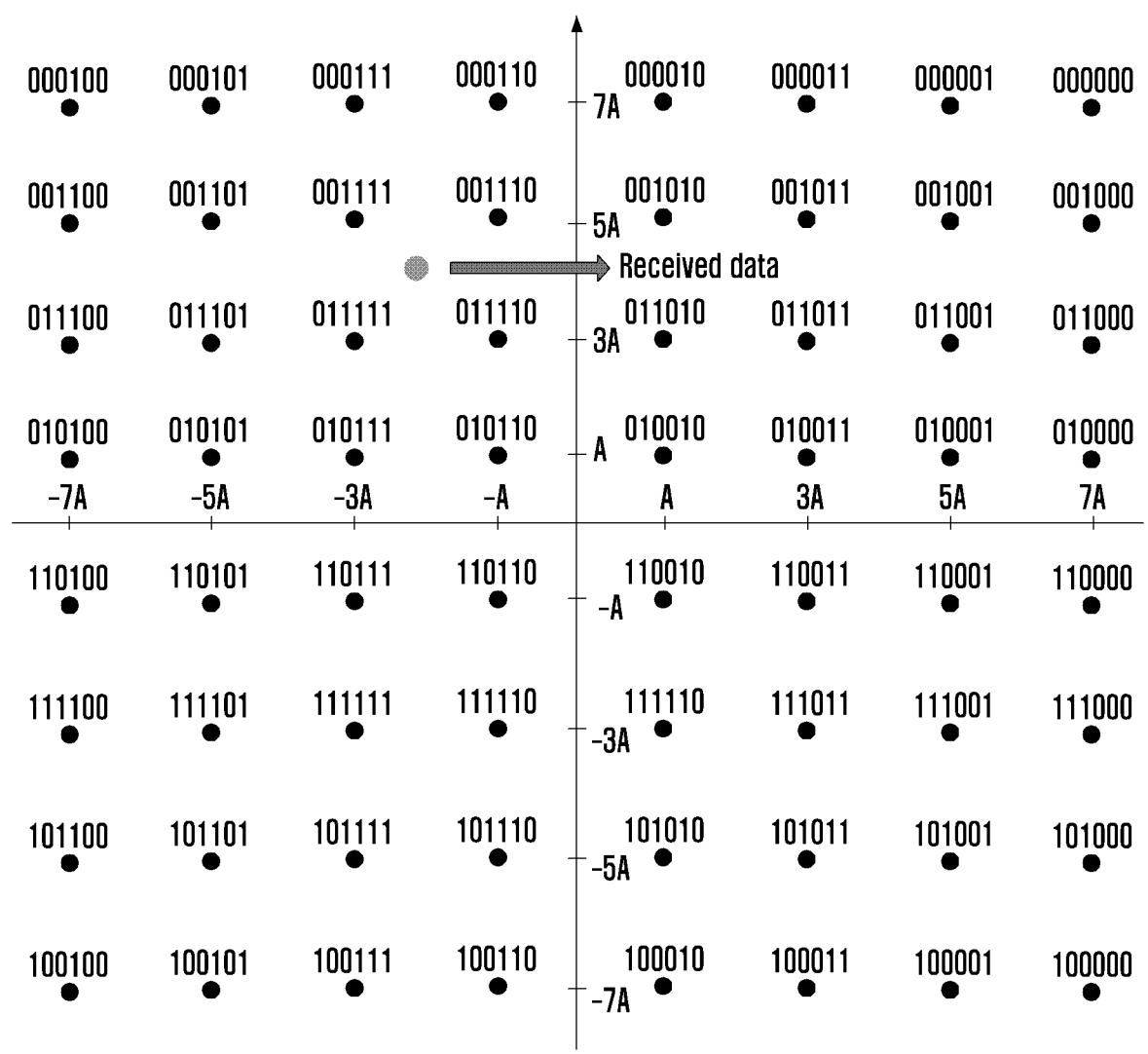
FIG. 1 illustrates an example scenario in which an apparatus decodes user data using machine learning (ML) and artificial intelligence (AI) techniques, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc., may be used herein to describe various elements, these elements should not be limited by these terms. These terms are generally only used to distinguish one element from another.

The terms, "neural network (NN)," "machine learning (ML)," and "artificial intelligence (AI)" are used interchangeably in the patent disclosure. The terms, "base station (BS)," "Cell," "evolved NodeB (eNodeB, eNB)," "next generation NodeB (gNodeB, gNB)," "sector," "remote unit (RU)," "transceiver," and "remote radio head (RRH)" are used interchangeable in the patent disclosure.

Followings are abbreviations used in the patent description:
Log Likelihood Ratio (LLR)
Neural Network (NN)
Base station (BS)
Remote Radio Head (RRH)
User Equipment (UE)
Quality of service (QoS)
QoS Class Identifier (QCI)
Neural Network (NN)
Radio Access Network (RAN)
RAN Intelligent controller (RIC)
Open-RAN (O-RAN)
Virtual RAN (VRAN)
Cloud RAN (CRAN)
Modulation and coding scheme (MCS)
Artificial intelligence (AI)
Real time (RT)
DownLink (DL)
Uplink (UL)
Artificial Intelligence (AI)
Multiple Input Multiple Output (MIMO),
Transmission mode (Tx Mode), and
Quadrature Amplitude Modulation (QAM)

Accordingly, the embodiment herein is to provide a method for decoding user data by an apparatus in a wireless network. The method includes receiving, by the apparatus, user data associated with a plurality of network parameters. The method includes training, by the apparatus, a neural network using the plurality of received network parameters. Further, the method includes computing, by the apparatus, an LLR using the trained neural network. Further, the method includes decoding, by the apparatus, the received user data using the computed LLR.

The disclosed method can be used for reducing the decoding latency of a UE/evolved NodeB (eNodeB, eNB)/VRAN/ORAN/CRAN, improving power efficiency of the UE/eNodeB/VRAN/ORAN/CRAN, reducing the computation time for VRAN/CRAN systems, and reducing the UE/BS hardware cost by using machine learning and artificial intelligence on a symbol or packet basis for computation unit based architectures (e.g., Graphics Processing Unit (GPU) based architectures, Non-GPU based architectures, central processing unit (CPU) based architectures, Non-CPU based architectures or the like). The reduction of the UE/BS hardware cost is achieved by the fact that neural network computations can be done independently of hardware or implemented using neural network hardware and decoding a whole transport block instead of symbol by symbol using ML and AI as a function of MCS, frequency of operation and block size.

The user of the apparatus can use neural networks to compute the LLR based on a modulation and coding scheme (MCS) and packet size. Further, the disclosed method provides multiple solutions for GPU and/or non-GPU based architecture Based on different NN for different MCS, signal to interference and noise ratio (SINR), MIMO capability, UE type and other network and UE parameters of various communication layers. Also, the disclosed method provides multiple solutions for each architecture as follows:

1. Separate sparse NN for each MCS (With/with grant information)
  a. Decoding symbol by symbol (can be serial or/and parallel processing for the user data),
  b. Decoding a whole packet at a time (one user and/or all users at a time)

Further, the disclosed method reduces the computationally complexity for VRAN/ORAN/CRAN, requires fewer computational cycles for computing the LLRs, and results in lesser latency. Further, the disclosed method is hardware independent and easy to implement.

The disclosed method will compute the LLR values using the NN, which is in a RIC module of an O-RAN system. The disclosed is applicable for GPU and non-GPU based VRAN/O-RAN/CRAN systems. The computed LLR values are conveyed to a Physical layer using an E2 interface. The media access control (MAC) scheduler will share to the RIC module QAM details along with the allocated grant to the UE. An NN is maintained on a per UE basis. The machine learning can be a function of QCI/QoS/bandwidth part (BWP)/subcarrier spacing (SCS)/bandwidth (BW)/Coherence BW/Coherence Time/Interference/noise/Operating frequency/UE capability/MIMO capability/UE capability/Transmission mode.

Further, the disclosed method maintains a neural network for all the users using a federated learning algorithm. Learning can be a function of QCI/QoS. The NN learning can be a function of QCI or QoS. The learning of NN parameters can be a function of Bandwidth paths, frequency operation, UE category, climate conditions, external events, real time traffic data, RRH/BS capabilities. Realization can be done using single or multiple NN on a per user/all user basis. Also, the learning can be done based on the 20 parameters.

Further, the disclosed method can be used at a BS/ORAN/CRAN/VRAN including UE side and AI based techniques can be used at BS/ORAN/CRAN/VRAN side.

The Sparse neural network is used to compute the LLR values for all QAM schemes (e.g., 16 QAM, 64 QAM, 256

QAM, 1024 QAM, and 4096 QAM). Various architectures are disclosed for GPU/non-GPU based VRAN systems.

Further, decoding can be done using Single Sparse NN irrespective of QAM scheme. Further, decoding can be done using different Single Sparse NN for different QAM scheme. Input layer has only two nodes irrespective of QAM scheme (user data is fed until all the in-phase data and quadrature data (IQ data) is decoded sequentially; size of the input vector is function of number of resource blocks (RBs) assigned to the user). Each time, Sparse NN weights will be loaded using a lookup table in the ML module which is in the RIC module in the ORAN systems. In this case, users are decoded sequentially. Single hidden layer has only 4 or 6 or 8 nodes irrespective of QAM scheme for (16 QAM, 64 QAM, 256 QAM, 1024 QAM, and 4096 QAM).

Based on the UE Multiple parallel transmissions (for MIMO systems/Rank of transmission/pre-coding matrix indicator (PMI)). O-RAN systems will segregate the IQ data streams before feeding to the Sparse NN. Different streams can have different QAM schemes based on the channel conditions. The disclosed method uses appropriate architecture intelligently based on packet delay and packet error tolerance (based on QCI/QoS requirements). Also, the method uses the appropriate architecture based on the application type such as enhanced machine type communication (eMTC)/narrowband Internet of Things (NB-IoT)/long term evolution (LTE)/$5^{th}$ generation (5G)/variable cloud resources. Further, the disclosed method can be used in the UE based on a lookup table. Sparse NN in the UE will load the lookup table values based on the various parameters. Further, the disclosed training techniques reduces the computational complexity in a dynamic manner based on QCI/QoS. All the training techniques can be implemented in the hardware device over an online or offline solution.

The disclosed method can be used for computing the LLR values using the sparse NN, which is in the RIC module of VRAN/O-RAN systems, which can be either GPU and/or non-GPU based architectures. The computed LLR values are conveyed to the physical layer using E2 interface. The MAC scheduler will share the QAM details along with the allocated Grant to the UE to the RIC module. In other architectures, similar interfaces can be used and different modules can be accessed by the memory. Further, the disclosed method maintains the sparse NN on a per UE basis. Learning can be a function of QCI/QoS and maintains the sparse NN for all the users using federated learning techniques. The learning can be a function of QCI/QoS. The learning of sparse NN parameters can be function of Bandwidth paths, frequency operation, UE category, Number of UE/BS antennas, real time traffic data, transmission mode, RRH/BS capabilities, climate conditions, external events. Realization can be done using single or multiple NN on a per user/all user basis and learning can be done based on the various network parameters.

The disclosed method can be implemented in distributed unit or centralized unit or cloud intelligence unit or RRH or Radio unit. Further, the disclosed method can be used in the wireless communication system. The communication system can be, for example, but not limited to a $4^{th}$ Generation (4G) system, $5^{th}$ Generation (5G) system, $6^{th}$ Generation (6G) system, Wi-Fi system, and a licensed assisted access (LAA) system. The disclosed method can be implemented in any $3^{rd}$ Generation Partnership Project (3GPP) or non-3GPP receiver. The disclosed method can be implemented for multi-connectivity related architecture. In dual/multi-connectivity case, the LLR values will be computed by different BSs which can conveyed to centralized BS or primary BS. Also, one can combine the IQ samples intelligently instead of LLR level.

Further, the apparatus can also use sparse deep neural network (DNN), convolutional neural network (CNN), recurrent neural network (RNN), Sparse CNN, Sparse RNN, and a Sparse DNN. Hybrid techniques or combination above mentioned NN or AI or both. Further, the apparatus can also use various activation functions, approximation of activation functions and/or linear approximation of activation functions. The performance of the apparatus will be function of the activation function. One can approximate the activated functions to reduce the computational complexity. Further, the apparatus can also intelligently remove the connections in the NN network if the weight of the link is negligible and again the apparatus can retrain the NN to achieve the expected performance. In this case, if performance does not meet the requirement, the apparatus will go back to an earlier NN. Further, the system can use ML/AI to improve the performance of these techniques. The person ordinary skill in the area can easily do slight modifications to the disclosed solutions. These techniques can run in ML module or can run in hardware (HW).

The disclosed method can be used for decoding the user data in the wireless network in a cost effective and quick manner. As the LLRs are computed faster and accurately, the UE experience will be improved and the base station can handle more traffic due to simplicity. Hence more UEs can be served. Based on the disclosed methods, the cost of cloud servers for the CRAN/VRAN can be reduced. The disclosed method can be used for decoding the user data in the wireless network with less power.

Referring now to the drawings and more particularly to FIGS. 1 to 7, 8A, 8B, and 8C, where similar reference characters denote corresponding features consistently throughout the figures, there are shown preferred embodiments.

FIG. 1 illustrating a method of decode the user date using machine learning (ML) and artificial intelligence (AI), according to an embodiment of the disclosure.

Referring to FIG. 1, it illustrates 64 QAM and a received corrupted data point in gray color and need to compute LLR of the received corrupted point. Real part of received data is I and imaginary part of received data is Q component. The decoding of the user data is explained in the FIGS. 2 to 7, 8A, 8B, and 8C.

Figure 2:
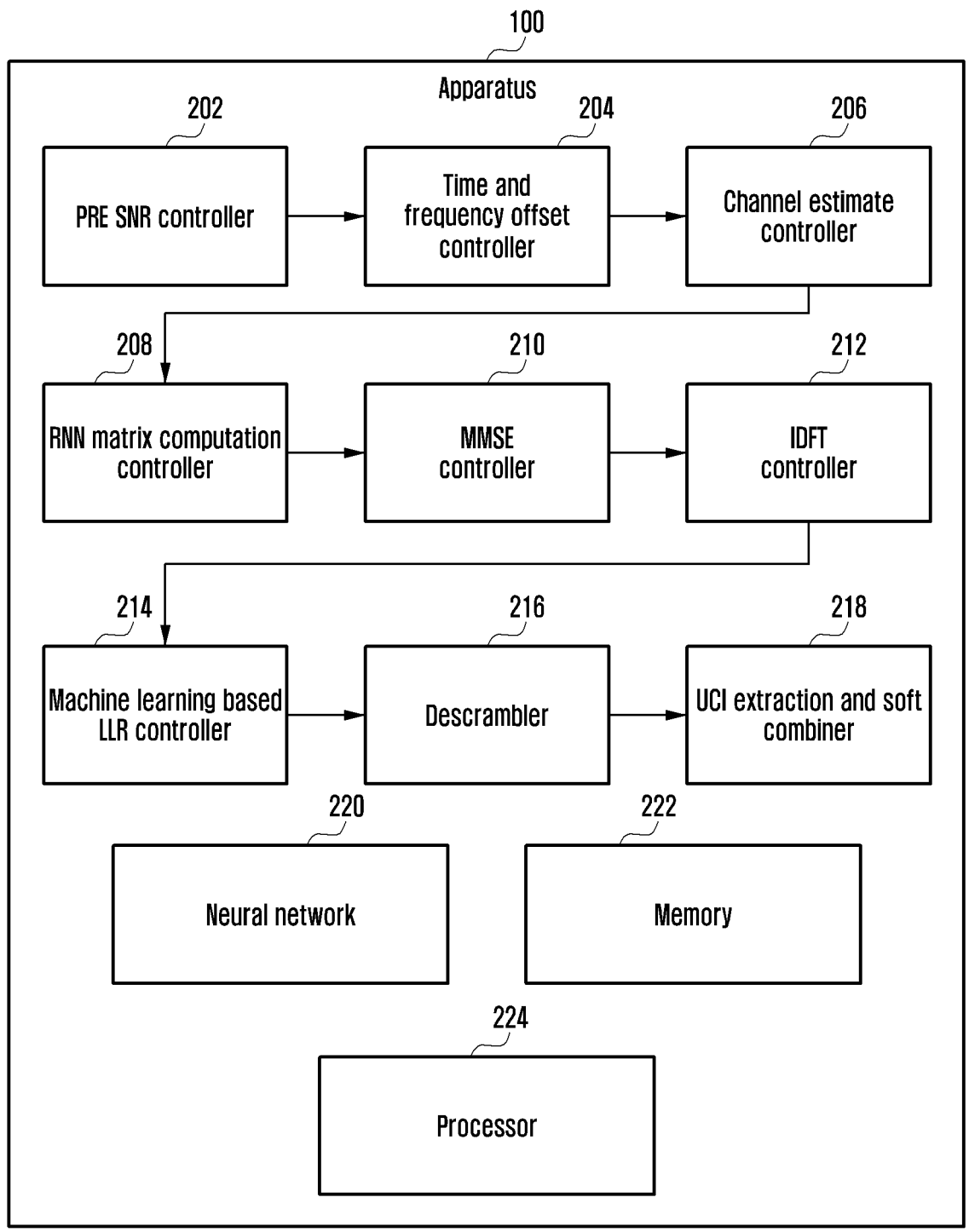
FIG. 2 illustrates a hardware component diagram of an apparatus for decoding the user data in a wireless network, according to an embodiment of the disclosure.

FIG. 2 illustrates a hardware component diagram of an apparatus (100) for decoding user data in a wireless network (1000), according to an embodiment of the disclosure.

Referring to FIG. 2, the apparatus (100) can be, for example, but not limited to a base station, a UE, an ORAN, a CRAN, and a VRAN. The UE can be, for example, but not limited to a cellular phone, a smart phone, a Personal Digital Assistant (PDA), a wireless modem, a tablet computer, a laptop computer, a wireless local loop (WLL) station, a Universal Serial Bus (USB) dongle, an Internet of Things (IoT), a virtual reality device, and an immersive system. The apparatus (100) may also include or be referred to by those skilled in the art as a base transceiver station, a radio base station, an access point, a radio transceiver, an eNB, a gNodeB (GNB), a 5G eNB, or the like.

The apparatus (100) includes a pre-signal to noise ratio (PRE SNR) controller (202), a time and frequency offset controller (204), a channel estimate controller (206), an RNN matrix computation controller (208), a Minimum Mean Square Error (MMSE) controller (210), an inverse discrete Fourier transform (IDFT) controller (212), a machine learning based LLR controller (214), a descrambler (216), a UCI [NO DEFINITION FOUND IN DISCLOSURE FOR UCI] extraction and soft combiner (218), a neural network (220), a memory (222), and a processor (224). The processor (224) is coupled with the PRE SNR controller (202), the time and frequency offset controller (204), the channel estimate controller (206), the RNN matrix computation controller (208), the MMSE controller (210), the IDFT controller (212), the machine learning based LLR controller (214), the descrambler (216), the UCI extraction and soft combiner (218), the neural network (220), and the memory (222). The conventional components (i.e., the PRE SNR controller (202), the time and frequency offset controller (204), the channel estimate controller (206), the RNN matrix computation controller (208), the MMSE controller (210), the IDFT controller (212), the descrambler (216), and the UCI extraction and soft combiner (218)) in the apparatus (100) are omitted for the sake of brevity of the patent specification. The neural network (220) can be, for example, but not limited to a 4 QAM based neural network, 16 QAM based neural network, 64 QAM based neural network, and 256 QAM based neural network.

The machine learning based LLR controller (214) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The machine learning based LLR controller (214) may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention.

The machine learning based LLR controller (214) receives the user data associated with a plurality of network parameters. The user data associated with the plurality of network parameters is received by segregating IQ data streams prior to feeding to the neural network (220), determining channel condition associated with the QAM scheme, and receiving the user data associated with the plurality of network parameters based on the segregated IQ data streams and the determined channel condition. The plurality of network parameters can be, for example, but not limited to a MMSE value, channel gains, a modulation scheme, a CQI information, a number of a UE in range, a location of a UE, a distance of a UE from the apparatus (100), a weather condition, RB information, operating frequency, RB bandwidth, a QoS, a QCI, BWP, SCS, Coherence BW, a coherence time, a coherence interference, noise, operating frequency, a capability of the UE, a MIMO capability, a transmission mode, a real time traffic data, RRH BS capabilities, I-Q values of the UE, QAM modulation details, a size of I-Q vector, allocated Resource Blocks to an user, a density of traffic associated with the BS, a distribution of traffic associated with the BS, a category of the BS, climate conditions of present day, information of special occasions on the present day associated with an area of the UE, an event based calendar of the UE, a vacation details of a user associated with the UE, a category of the UE, network and UE parameters of all the layers, and a subscription details of the UE.

Further, the machine learning based LLR controller (214) trains the neural network (220) using the plurality of received network parameters. The neural network (220) is implemented in an RIC module of at least one of an O-RAN and a VRAN. The neural network (220) is trained by creating multiple batches of training samples, wherein each training sample uses at least one modulation scheme, training QAM schemes, wherein each QAM scheme comprises a unique code embedded in the user data, generating shuffled training samples for each batch from multiple batches, calculating an LLR corresponding to each shuffled training sample, and shuffling the calculated LLR across the batches while training.

Training details of NN:

The neural network (220) creates multiple batches of training data. Each one uses a certain modulation scheme. Further, the neural network (220) can train for 4, 16, 64, 256 and 1024 QAM schemes. Each one has a unique code embedded in the user information. Hence a batch corresponds to a fixed modulation scheme. The neural network (220) generates shuffled training samples for each batch. In an example, for 16 QAM, there are 16 possible signals. The user of the apparatus (100) will calculate the exact LLR corresponding to each and thus create a batch. Further, the user will shuffle across batches and within batches while training. This is to enhance training. The neural network (220) will use back propagation to update and learn weights. The activation functions inside are rectified linear unit (ReLU) activated except a first layer which is sigmoid activated and the final layer which uses linear activation. Weight updates are performed using Adam techniques. The complex input is equivalent to 2 real inputs. After training, the user will test the neural network (220). If the testing is done correctly, the neural network (220) is used for computing the LLR. Further, the apparatus (100) determines whether to implement single NN or multiple NN based on MCS or/and MIMO or/and SINR and/or wireless network and UE parameters.

As mentioned above, the user of the apparatus (100) can train the one NN for each modulation. Whenever the base station needs the weight, a module can use a lookup table to load the NN weights. Inputs to the LLR module have a limited range of values. In the training phase, the user of the apparatus (100) will generate a million points and train the NN (220) using optimal LLR values for random points. This training will only need to be done once. However, the user of the apparatus can redo the training periodically. Another method is generating single NN weights for all MCS. The user can also come up with a hybrid method using an online learning, offline learning, or hybrid of the online learning and the offline learning. For inputs that do not belong to the training set, the neural network (220) will output an interpolated result. This may be good enough for most applications and thus the user of the apparatus (100) does not have to train for all possibilities but for a sufficiently large subset. Since the LLR formula is fixed, the user of the apparatus (100) will only need to train once. No need for subsequent training.

Once trained and tested, the disclosed method can be deployed without hassle. In hardware, there are fixed/floating point issues. These need to be considered while implementing the hardware. However as mentioned earlier that final implementation consists of relatively simple hardware. The disclosed method is independent of hardware. As the disclosed solution can be implemented in cloud based systems without hassle. Once the user of the apparatus (100) has trained neural network (220), the computation complexity will reduce. This is because the hardware of the neural network (220) consists of simple address and multipliers. The non-linear activation functions involved are sigmoid and ReLU functions. The ReLU function is simply max (x, 0) function. This is a comparator which is also implementable.

Sigmoid function is as follows:

$$\frac{1}{1+e^{-x}}$$

It is having a piecewise approximation which may be used to bring down complexity. Thus, the complexity of the neural network implementation is reduced. While training, the user of the apparatus (100) will use the functions as described above. But while deploying the user of the apparatus (100) will use the piecewise linear approximations wherever applicable.

Further, the network parameters are exchanged over a standard interface and a non-standard interface. These messages can be exchanged over a wireless medium or wired medium or both. In the cloud systems, it will be accessing memory locations. The disclosed method is applicable for various split options and different architectures and all technologies.

Further, the machine learning based LLR controller (214) computes an LLR using the trained neural network (220). In an embodiment, the LLR is computed by receiving a number of RBs, an operating frequency, an MCS, a number of independent streams, and an SINR, and sequentially or parallel computing the LLR based on the number of RBs, the operating frequency, the MCS, the number of independent streams, and the SINR. In an embodiment, the LLR is computed for all packets. In another embodiment, the LLR is computed for each bit serially. In another embodiment, the LLR is computed for all user data. In another embodiment, the LLR is computed for one bit at a time. In another embodiment, the LLR is computed for one bit at a time and for all user data at once.

Further, the machine learning based LLR controller (214) decodes the received user data using the computed LLR. In an embodiment, the received user data is decoded by transferring the computed LLR to a physical layer using an E2 interface, and decoding the received user data using the computed LLR. In another embodiment, the received user data is decoded by receiving a size of a user data vector, QAM information, and a number of RBs assigned to the user data sequentially, and serially decoding the received user data on a per packet basis using the computed LLR based on the size of the user data vector, the QAM information, and the number of the RBs assigned to the user data sequentially.

In another embodiment, the received user data is decoded by receiving QAM information, a size of IQ data of each user data, and allocated RBs to each user data, and parallel decoding the received user data per symbol basic using the computed LLR based on the QAM information, the size of IQ data of each user data, and allocated RBs to each user data.

In another embodiment, the received user data is decoded by providing the user data until all IQ data is decoded sequentially, assigning a size of an input vector as a function of number of RBs to the user data, loading a weight using a lookup table in the neural network, and sequentially decoding the user data using the computed LLR, the size of the input vector and the weight function.

The decoding is just an example for O-RAN architecture where backend physical layer is in a cloud. The disclosed method is equally applicable for all architectures and all 3GPP and non-3GPP split options. Further, the disclosed method is also applicable for Cloud RAN/Centralized RAN and other cloud based architectures. For brevity, not every architecture is explained herein in detailed. In different architectures there will be different interfaces between the LLR computing module and the LLR output subsequent module. In an example, the base station (404) decodes the user data in the wireless network (1000) is depicted in FIG. 4.

Figure 4:
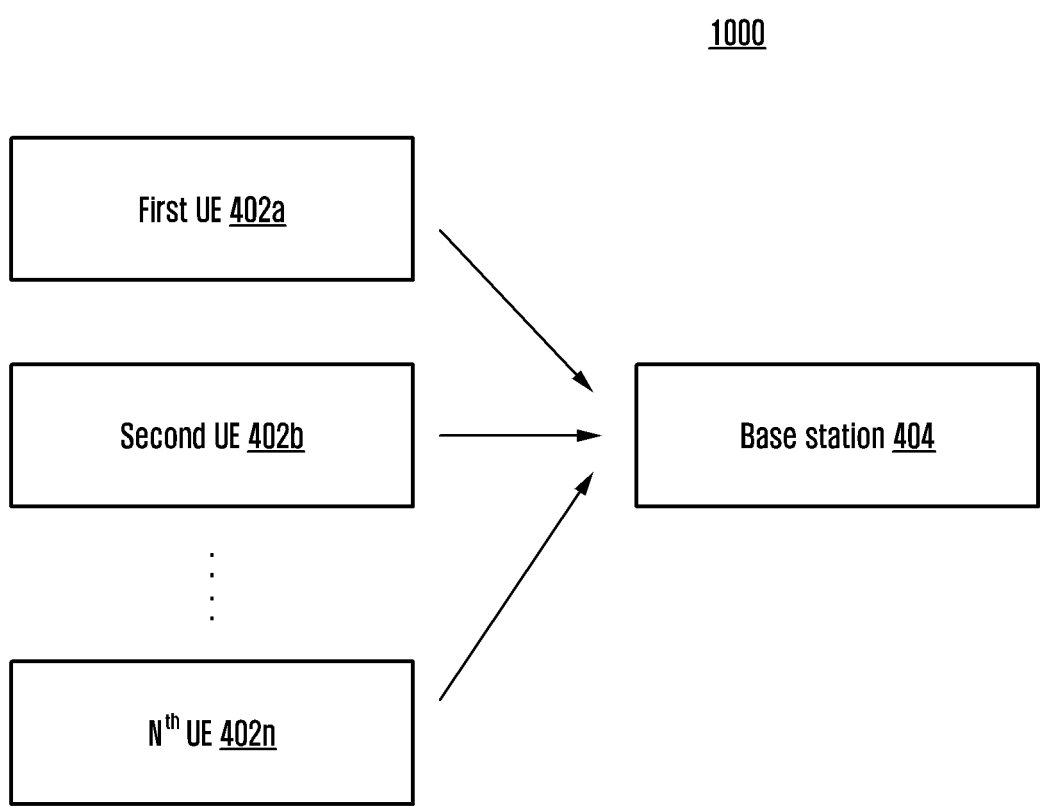
FIG. 4 illustrates an example scenario in which a base station decodes the user data in the wireless network, according to an embodiment of the disclosure.

FIG. 4 illustrates an example scenario in which a base station decodes the user data in the wireless network, according to an embodiment of the disclosure.

Referring to FIG. 4, the wireless network (1000) includes one or more UE (402a, 402b, ... 402n) and the base station (404). The base station (404) receives the user data from the one or more UE (402a-402n). Based on the received user data, the base station (404) decodes the user data based on the disclosed method. The operations of the base station (404) are similar to those of the apparatus (100), so for the sake of brevity, descriptions of the same operations are omitted. In another example, the UE (402) decodes the user data in the wireless network (1000) is depicted in the FIG. 5.

Figure 5:
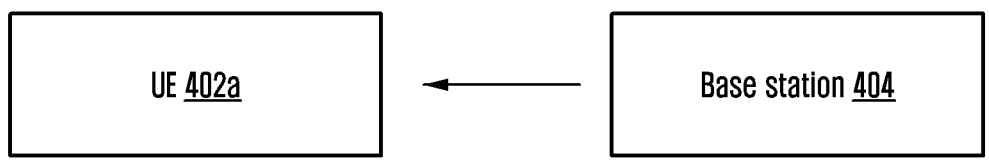
FIG. 5 illustrates an example scenario in which a user equipment (UE) decodes the user data in the wireless network, according to an embodiment of the disclosure.

FIG. 5 illustrates an example scenario in which a UE decodes the user data in the wireless network, according to an embodiment of the disclosure.

Referring to FIG. 5, the wireless network (1000) includes the UE (402) and the base station (404). The UE (402) receives the user data from the base station (404). Based on the received user data, the UE (402) decodes the user data based on the disclosed method. The operations of the UE (402) are similar to those of the apparatus (100), so for the sake of brevity, descriptions of the same operations are omitted. In another example, the VRAN decodes the user data in the wireless network (1000) is depicted in the FIG. 6.

Figure 6:
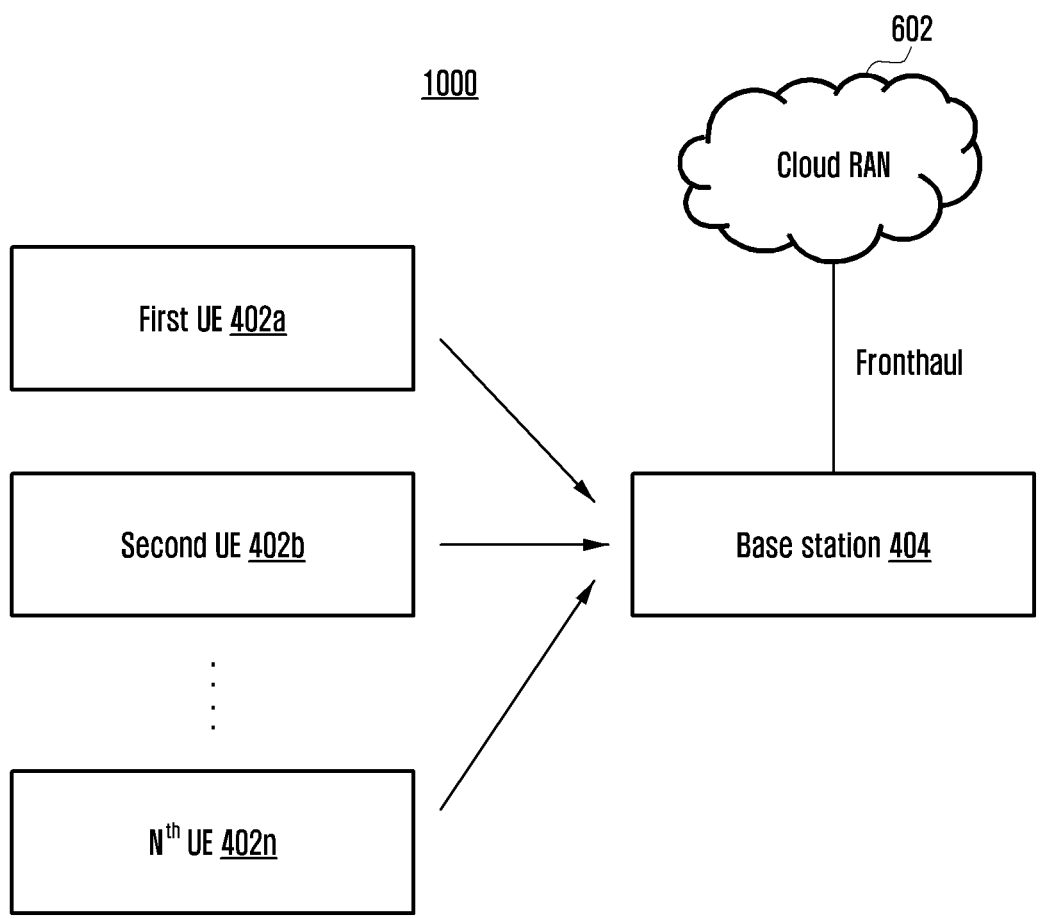
FIG. 6 illustrates an example scenario in which a virtual radio access network (VRAN) decodes the user data in the wireless network, according to an embodiment of the disclosure.

FIG. 6 illustrates an example scenario in which a VRAN decodes the user data in the wireless network, according to an embodiment of the disclosure.

Referring to FIG. 6, in the base station (404) or the VRAN or the UE (402), the user data are decoded sequentially/parallel and many NN for MCS, the user data are decoded sequentially/parallel and only one NN for MCS, and the user data are decoded sequentially/parallel and only one NN for all MCSs. The base station 404 may utilize a fronthaul connection to a Cloud RAN 602 to decode the user data via the wireless network (1000).

The processor (224) is configured to execute instructions stored in the memory (222) and to perform various processes. The communication interface (not shown) is configured for communicating internally between internal hardware components and with external devices via one or more networks. The processor (224) may include one or more processing units (e.g., in a multi-core configuration).

The memory (222) stores instructions to be executed by the processor (224). The memory (222) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (222) may, in some examples, be considered a non-transitory storage medium. The term "non-transitory" may indicate that the storage medium is not embodied in a carrier wave or a propagated signal. However, the term "non-transitory" should not be interpreted that the memory (222) is non-movable. In certain examples, a non-transitory storage medium may store data that can, over time, change (e.g., in Random Access Memory (RAM) or cache).

Although the FIG. 2 shows various hardware components of the apparatus (100) but it is to be understood that other embodiments are not limited thereon. In other embodiments, the apparatus (100) may include a greater or lesser number of components. Further, the labels or names of the components are used only for illustrative purpose and does not limit the scope of the invention. One or more components can be combined together to perform same or substantially similar function for decoding the user data in the wireless network (1000).

Figure 3:
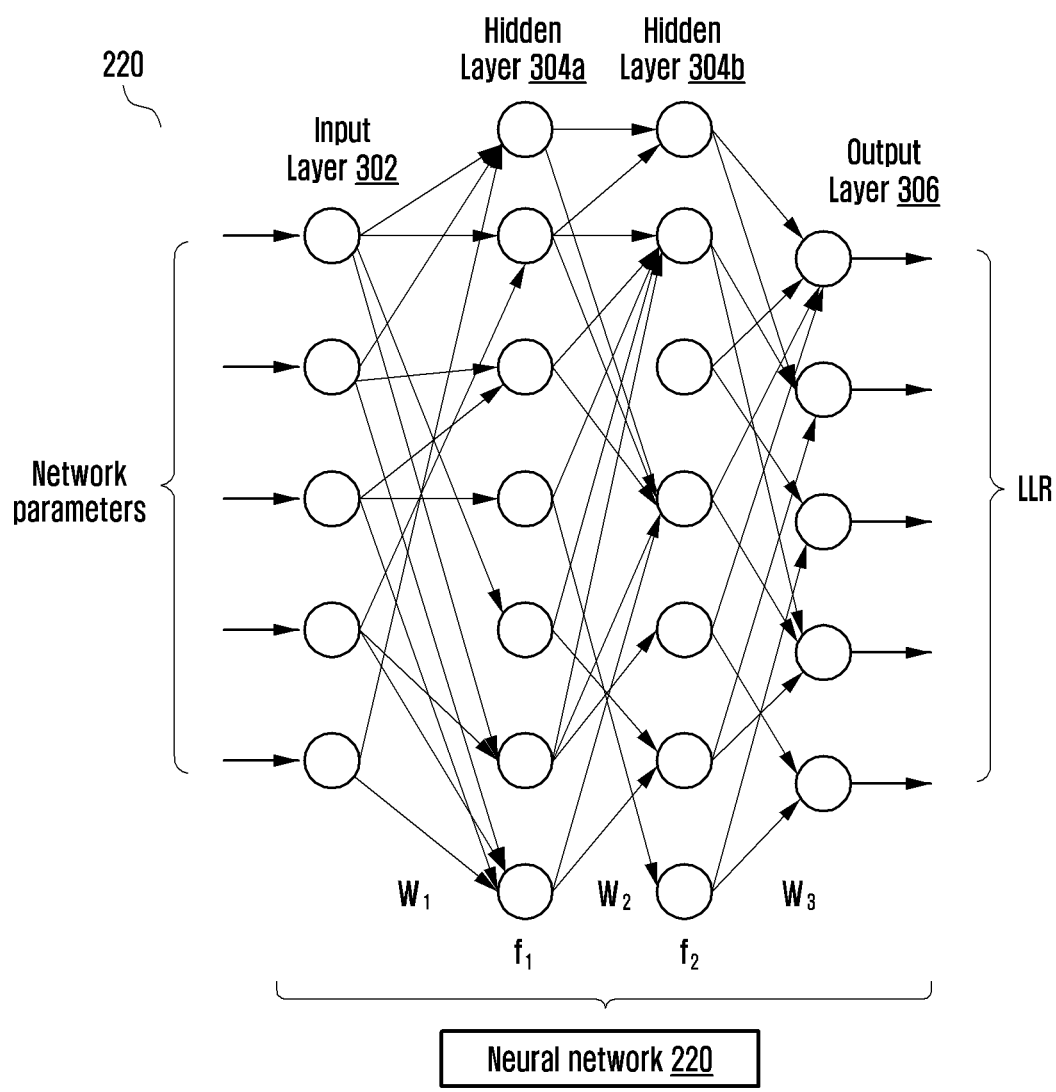
FIG. 3 illustrates a training of a neural network (NN), according to an embodiment of the disclosure.

FIG. 3 illustrates a training of the NN (220), according to an embodiment of the disclosure.

Referring to FIG. 3, the NN (220) is composed of an input layer (302), hidden layers (304a and 304b) of 8 nodes and an output layer (306). In an example, the size of the output layer (306) is log 2 (M) for M QAM. The apparatus (100) may use a piecewise approximated Swish activation function, f(x), after the hidden layer (304a and 304b).

$$f(x) = \begin{cases} 0 & \text{for } x \leq -2 \\ \frac{1}{4}(x+2)x & \text{for } |x| < 2 \\ x & \text{for } x \geq -2 \end{cases}$$

This helps to bring down the complexity without sacrificing much on MMSE. The size of the hidden layer (304a and 304b) is kept constant for all modulation schemes. No activation was used for the output layer (306) as it restricts the range of the predicted output. The method uses a normal weight initialization of the initial fully connected model to start the training process. As the neural network (220) operates on real numbers, the apparatus (100) passes the imaginary part of the channel output as another input to the neural network (220).

In another example, the user of the apparatus (100) generates 100,000 random samples of 'I' and 'Q' and corresponding LLR values for each random 'I' and 'Q' are computed samples using generic methods. When the user of the apparatus (100) feeds an $N^{th}$ sample, then sparse NN will generate the LLR values. But generated LLR values might be far away from the actual LLR values. Initially, all link weights are assigned arbitrary weights. Sparse NN uses gradient descent techniques to update the weights of the links between the neurons such that mean square error is minimum. With 100,000 integrations, weights of the sparse NN will get stabilized. This completes the training phase. After training, the user of the apparatus (100) will feed 'I' and 'Q' values to obtain the correct LLR values.

In an example, in a dense neural network, all layers (302-306) in a column can be evaluated in parallel. Hence the activation functions as well as the computation of large layers can be offloaded to VRAN assisted with a powerful GPU.

Figure 7:
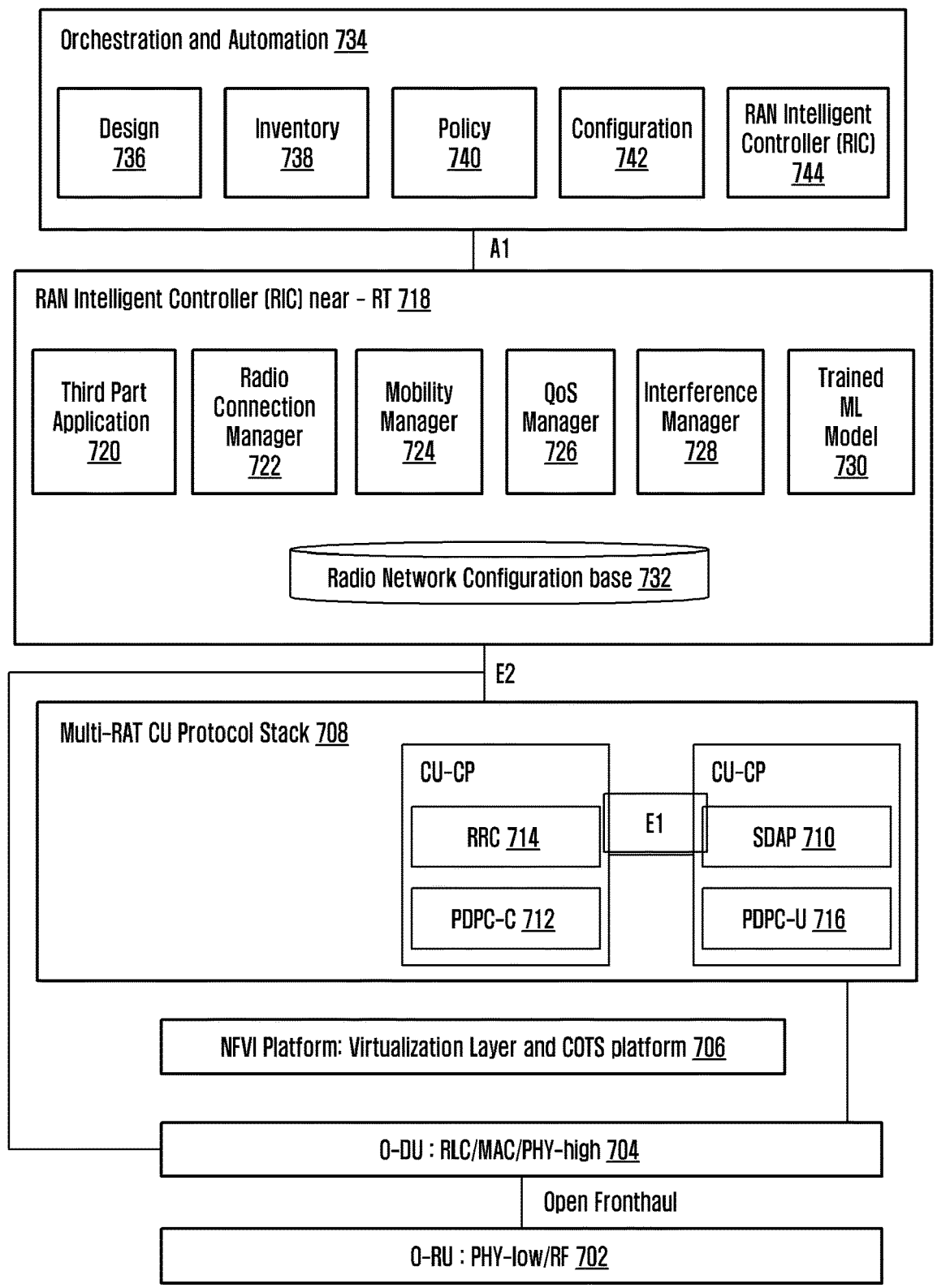
FIG. 7 illustrates an architecture diagram of an open radio access network (ORAN) for decoding the user data, according to an embodiment of the disclosure.

FIG. 7 illustrates an architecture diagram (700) of the ORAN for decoding the user data, according to an embodiment of the disclosure.

Referring to FIG. 7, a conventional architecture diagram of the ORAN is shown. Therefore explanation of the conventional functions of the conventional components (O-RU PHY-low/RF 702, O-DU RLC/MAC/PHY-high 704, NFVI Platform 706, Multi-RAT CU protocol stack 708, SDAP 710, PDPC-C 712, RRC 714, PDPC-U 716, RIC near—RT 718, third part application 720, radio connection manager 722, mobility manager 724, QoS manager 726, interference manager 728, radio network configuration base 732, orchestration and automation 734, design 736, inventory 738, policy 740, configuration 742, and RIC 744) in the ORAN may be omitted for the sake of brevity of the patent specification, and the explanation is focused on the use of the ML system (or trained ML model) (730) using the neural network (220) inside the RAN Intelligent Controller (RIC) non-Real Time (non-RT) unit (718) of the ORAN. The ML system (730) intelligently trains the neural network (220) (e.g., a RL based NN) using the plurality of received network parameters. Similar to the ORAN, the disclosed method can be implemented on the VRAN, the cloud RAN, a centralized RAN, and any cloud based RAN. A centralized controller and a ML/Artificial Intelligence module is included in all the RAN architectures, where each RAN architecture have different interfaces. Further, the ML/NN/AI modules estimated values will be conveyed to MAC/PHY/L3 modules.

The use of NN (220) along with optimal central NN improves the spectral efficiency of the overall wireless network (1000) and also reduces the latency of the communication between the BS (404) and the UE (402).

In the disclosed method, the physical module will request RIC module to compute the LLR values of the users via the E2 interface. MAC layer will convey UE(s) grant details (i.e., resource details of UE(s), MCS information of the UE(s)) via E2 interface. The RIC module will compute the LLR values and convey back to a PHY-low via the E2 interface.

Further, the E2 interface have been standardized for data collection in the O-RAN architecture, so that the NN input parameters can be easily traced on the interface. By putting logs in the E2 interface, the apparatus (100) can figure out whether the MAC layer is conveying the scheduling grant details or not. This information can be captured using logs. Similarly, Phy-High will convey the IQ data of the all the users via E2 interface. This can be easily detected using logs. This unusual data can be captured using the logs. Once after the RIC module computes the LLR values of all the UEs, and then the RIC module will convey it to the Phy-High via E2 interface. This unusual data can be captured using the logs.

The disclosed sparse architecture is computationally efficient. The disclosed architecture can be selected based on QoS/QCI. Further, the disclosed method can be used for GPU and non-GPU based architecture. The disclosed sparse NN can be run in cloud RAN, Open RAN, virtual RAN, centralized RAN. These can be run in GPU and/or Non-GPU based architectures. Sparse NN can be selected based on QAM, channel conditions, delay requirements and packet error constraints and lower capital expenditures (CAPEX). A greater number of RRHs can be run in the cloud systems. It is compatible for 5G/6G/Small cells/Wi-Fi systems. The disclosed methods are technology agnostic and transmission mode agnostic. Further, they provide faster decoding and low latency. A greater number of RRH/Base stations can run in VRA/CRAN/ORAN, resulting in lower operating and maintenance costs and lower CAPEX.

Consider a disclosed method, results in lesser number of cores per RRH for VRAN/CRAN systems. The cloud system can support a greater number of RRH units. Further, the disclosed method results in lesser number of cores per RRH for VRAN/CRAN systems. The cloud system can support a greater number of RRH units, so as to reduce computational complexity of an LLR module for VRAN/CRAN/ORAN systems. The disclosed method requires fewer cores for computing the LLRs and hence less investment in the ORAN system.

In an embodiment, different users can have different grants. The grant has MCS and number of resource block information. Different users can have different independent data streams (i.e., MIMO transmission rank>=1). Based on the network and UE parameters, IQ samples will be processed in the physical (Phy) layer. This Phy layer can be in an ORAN centralized unit (CU) or distributed unit (DU), or cloud or RRH or radio unit (RU) or BS, based on the architecture. These IQ samples will be sent to various modules before sending it to LLR or Demodulator module. One can implement in GPU or CPU or hardware or ML/AI intelligence layer. Output of the LLR/Demodulator module is LLR values. The number of LLR values is a function of the QAM scheme.

In an ORAN system, appropriate IQ data is sent to the machine learning based LLR controller (214) (i.e., IQ is sent to an intelligence layer from the physical layer), then the decoded values will be returned to the physical layer (i.e., LLR values can be returned to the physical layer). For example, subsequent modules are in an intelligence layer, instead of returning to the physical layer, it can send it to other machine learning module. In an example, that machine learning based LLR controller (214) is operated in the cloud.

Figure 8B:
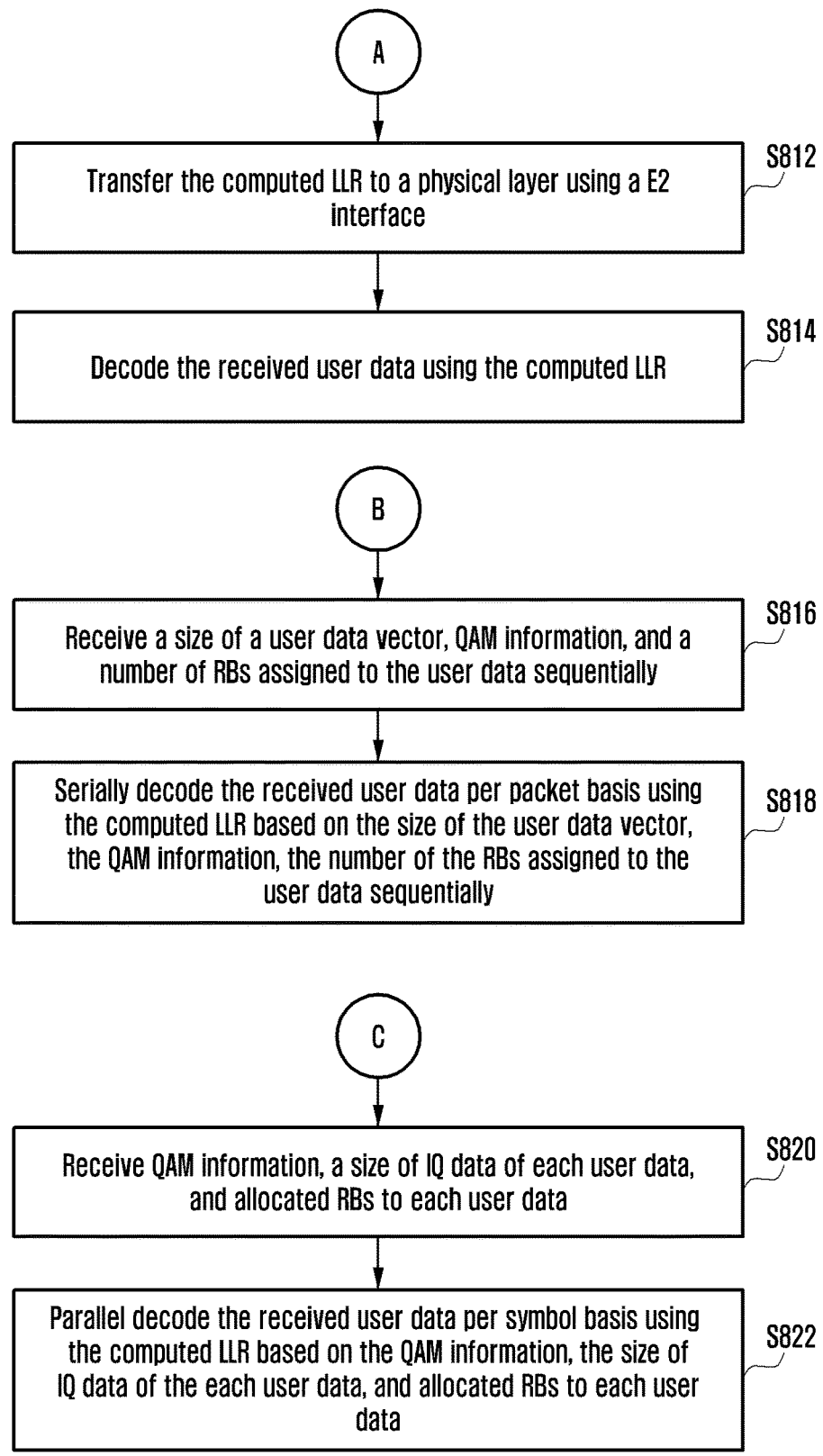
Figure 8C:
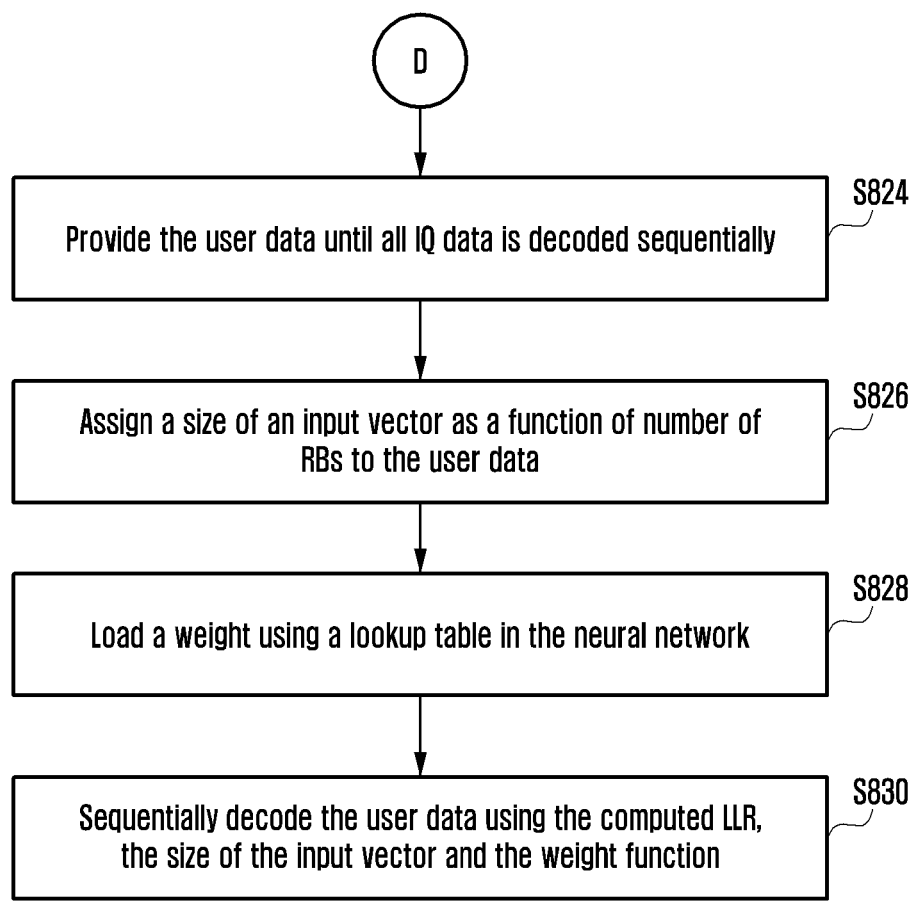

FIGS. 8A to 8C are flow charts S800 illustrating a method for decoding the user data by the apparatus (100) in the wireless network (1000), according to various embodiments of the disclosure.

Referring to FIGS. 8A to 8C, the operations S802-S830 are performed by the machine learning based LLR controller (214).

At operation S802, the method includes segregating the IQ data streams prior to feeding to the neural network (220). At operation S804, the method includes determining the channel condition associated with the QAM scheme. At operation S806, the method includes receiving the user data associated with the plurality of network parameters based on the segregated IQ data streams and the determined channel condition. At operation S808, the method includes training the neural network (220) using the plurality of received network parameters. At operation S810, the method includes computing the LLR using the trained neural network (220).

In an embodiment, at operation S812, the method includes transferring the computed LLR to the physical layer using the E2 interface. At operation S814, the method includes decoding the received user data using the computed LLR.

In another embodiment, at operation S816, the method includes receiving the size of the user data vector, the QAM information, and the number of RBs assigned to the user data sequentially. At operation S818, the method includes serially decoding the received user data on a per packet basis using the computed LLR based on the size of the user data vector, the QAM information, the number of the RBs assigned to the user data sequentially.

In another embodiment, at operation S820, the method includes receiving QAM information, the size of IQ data of each user data, and allocated RBs to each user data. At operation S822, the method includes parallel decoding the received user data on a per symbol basis using the computed LLR based on the QAM information, the size of IQ data of each user data, and allocated RBs to each user data.

In another embodiment, at operation S824, the method includes providing the user data until all IQ data is decoded sequentially. At operation S826, the method includes assigning a size of an input vector as a function of a number of RBs to the user data. At operation S828, the method includes loading a weight using a lookup table in the neural network (220). At operation S830, the method includes sequentially decoding the user data using the computed LLR, the size of the input vector, and the weight function.

The embodiments disclosed herein can be implemented using at least one hardware device and performing network management functions to control the hardware device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for decoding user data by an apparatus in a wireless network, comprising:
   segregating, by the apparatus, in-phase data and quadrature data (IQ data) streams, based on quadrature amplitude modulation (QAM) scheme of each of the IQ data streams;
   determining, by the apparatus, a channel condition associated with each of the QAM schemes of the segregated IQ data streams;
   receiving, by the apparatus, user data associated with a plurality of network parameters, based on the segregated IQ data streams and the determined channel conditions;
   training, by the apparatus, a neural network using the plurality of network parameters;
   computing, by the apparatus, a log likelihood ratio (LLR) using the trained neural network;
   transferring, by the apparatus, the computed LLR to a physical layer; and
   decoding, by the apparatus, the received user data using the computed LLR.

2. The method of claim 1, wherein the plurality of network parameters comprises at least one of:
   a Minimum Mean Square Error (MMSE) value,
   channel gains,
   a modulation scheme,
   Channel Quality Indicator (CQI) information,
   a number of a User Equipment (UE) in range,
   a location of a user equipment (UE),
   a distance of the UE from the apparatus,
   a weather condition,
   resource block (RB) information,
   an operating frequency,
   an RB bandwidth,
   a Quality of Service (QoS),
   a QoS Class Identifier (QCI),
   a bandwidth part (BWP), a Subcarrier Spacing (SCS),
a coherence bandwidth (BW),
a coherence time,
a coherence interference,
a noise,
an operating frequency,
a capability of the UE,
a Multiple Input Multiple Output (MIMO) capability,
a transmission mode,
real time traffic data,
remote radio head (RRH) base station (BS) capabilities,
in-phase data and quadrature data (I and Q) values of the UE,
Quadrature Amplitude Modulation (QAM) modulation details,
a size of in-phase data and quadrature data (I and Q) vector,
allocated Resource Blocks to the UE,
a density of traffic associated with the BS,
a distribution of traffic associated with the BS,
a category of the BS,
climate conditions of present day,
information of special occasions on the present day associated with an area of the UE,
an event based calendar of the UE,
vacation details of a user associated with the UE,
a category of the UE, or
subscription details of the UE.

3. The method of claim 1,
wherein decoding, by the apparatus, of the received user data using the computed LLR comprises performing one of:
  receiving, by the apparatus, a size of a user data vector, Quadrature Amplitude Modulation (QAM) information, Multiple Input Multiple Output (MIMO) rank details, and a number of resource blocks (RBs) assigned to the user data sequentially, and serially decoding, by the apparatus, the received user data on a per packet basis using the computed LLR based on the size of the user data vector, the QAM information, the MIMO rank details, and the number of RBs assigned to the user data sequentially,
  receiving, by the apparatus, the QAM information, a size of in-phase data and quadrature data (IQ data) of each user data, and allocated RBs to each user data, and parallel decoding, by the apparatus, the received user data per symbol basic using the computed LLR based on the QAM information, the size of IQ data of each user data, and allocated RBs to each user data, or
  providing, by the apparatus, the user data until all IQ data is decoded sequentially or in parallel, assigning, by the apparatus, a size of an input vector as a function of the number of RBs to the user data, loading, by the apparatus, a weight function using a lookup table in the neural network, and sequentially decoding, by the apparatus, the user data using the computed LLR, the size of the input vector and the weight function, and
wherein the LLR is computed for at least one of all packets, each bit serially, all user data, one bit at a time, or one bit at a time and for all user data at once.

4. The method of claim 1, wherein the neural network is trained by:
  creating multiple batches of training samples, each training sample using at least one modulation scheme,
  training Quadrature Amplitude Modulation (QAM) schemes, wherein each QAM scheme comprises a unique code embedded in the user data,
  generating shuffled training samples for each batch from multiple batches,
  computing an LLR corresponding to each shuffled training sample, and
  shuffling the computed LLR across the batches while training.

5. The method of claim 1, wherein the apparatus comprises at least one of a base station (BS), a User Equipment (UE), an Open Radio Access Network (ORAN), a centralized Radio Access Network (CRAN), or a virtual Radio Access Network (VRAN).

6. The method of claim 1, wherein the computing, by the apparatus, of the LLR comprises:
  receiving at least one of a number of resource blocks (RBs), an operating frequency, a modulation and coding scheme (MCS), a number of independent streams, Multiple Input Multiple Output (MIMO) details, layer information associated with the wireless network, layer information associated with a user equipment (UE), a sub-set of network parameters, or a signal to interference and noise ratio (SINR), and
  sequentially or parallel computing the LLR based on the at least one of the number of RBs, the operating frequency, the MCS, the number of independent streams, the MIMO details, the layer information associated with the wireless network, the layer information associated with the UE, the sub-set of network parameters, or the SINR.

7. The method of claim 1, wherein the neural network comprises an input layer, one or more hidden layers each comprising a plurality of nodes, and an output layer.

8. The method of claim 7, wherein a size of the output layer is log 2 (M) for an M Quadrature Amplitude Modulation (QAM) scheme.

9. The method of claim 7, further comprising using a piecewise approximated Swish activation function, f(x), after the one or more hidden layers, where $$f(x) = \begin{cases} 0 & \text{for } x \le -2 \\ \frac{1}{4}(x+2)x & \text{for } |x| < 2 \\ x & \text{for } x \ge -2 \end{cases}$$

10. An apparatus for decoding user data in a wireless network, the apparatus comprising:
  memory; and
  at least one processor coupled with the memory,
  wherein the memory store one or more computer programs including computer-executable instructions that, when executed by the at least one processor, cause the apparatus to:
    segregate in-phase data and quadrature data (IQ data) streams based on quadrature amplitude modulation (QAM) scheme of each of the IQ data streams,
    determine a channel condition associated with each of the QAM schemes of the segregated IQ data streams,
    receive the user data associated with a plurality of network parameters, based on the segregated IQ data streams and the determined channel conditions,
    train a neural network using the plurality of network parameters,
    compute a log likelihood ratio (LLR) using the trained neural network, transfer the computed LLR to a physical layer, and decode the received user data using the computed LLR.

11. The apparatus of claim 10, wherein the plurality of network parameters comprises at least one of:
a Minimum Mean Square Error (MMSE) value,
channel gains,
a modulation scheme,
Channel Quality Indicator (CQI) information,
a number of a User Equipment (UE) in range,
a location of a UE,
a distance of the UE from the apparatus,
a weather condition,
resource block (RB) information,
an operating frequency,
an RB bandwidth,
a Quality of Service (QoS),
a QoS Class Identifier (QCI),
a bandwidth part (BWP),
a Subcarrier Spacing (SCS),
a coherence bandwidth (BW),
a coherence time,
a coherence interference,
noise,
an operating frequency,
a capability of the UE,
a Multiple Input Multiple Output (MIMO) capability,
a transmission mode,
a real time traffic data,
remote radio head (RRH) base station (BS) capabilities,
in-phase data and quadrature data (I and Q) values of the UE,
Quadrature Amplitude Modulation (QAM) modulation details,
a size of in-phase data and quadrature data (I and Q) vector,
allocated Resource Blocks (RBs) to a user,
a density of traffic associated with the BS,
a distribution of traffic associated with the BS,
a category of the BS,
climate conditions of present day,
information of special occasions on the present day associated with an area of the UE,
an event based calendar of the UE,
vacation details of a user associated with the UE,
a category of the UE, or
subscription details of the UE.

12. The apparatus of claim 10, wherein the one or more computer programs further comprise computer-executable instructions that, when executed by the at least one processor, cause the apparatus to perform at least one of:
receive a size of a user data vector, Quadrature Amplitude Modulation (QAM) information, Multiple Input Multiple Output (MIMO) rank details, or a number of resource blocks (RBs) assigned to the user data sequentially; and serially decoding the received user data on a per packet basis using the computed LLR based on the size of the user data vector, the QAM information, and the number of RBs assigned to the user data sequentially,
receive QAM information, a size of in-phase data and quadrature data (IQ data) of each user data, and allocated RBs to each user data; and parallel decoding the received user data on a per symbol basis using the computed LLR based on the QAM information, the size of the IQ data of each user data, and the allocated RBs to each user data, or
provide the user data until all IQ data is decoded sequentially, assigning a size of an input vector as a function of the number of RBs assigned to the user data, loading a weight function using a lookup table in the neural network, and sequentially decoding the user data using the computed LLR, the size of the input vector, and the weight function, and
wherein the LLR is computed for at least one of all packets, each bit serially, all user data, one bit at a time, or one bit at a time and for all user data at once.

13. The apparatus of claim 10, wherein the neural network is trained by:
creating multiple batches of training samples, each training sample using at least one modulation scheme,
training Quadrature Amplitude Modulation (QAM) schemes, each QAM scheme comprising a unique code embedded in the user data,
generating shuffled training samples for each batch from multiple batches,
calculating an LLR corresponding to each shuffled training sample, and
shuffling the calculated LLR across the batches while training.

14. The apparatus of claim 10, wherein the apparatus comprises at least one of a base station (BS), a User Equipment (UE), an Open Radio Access Network (ORAN), a Centralized Radio Access Network (CRAN), or a Virtual Radio Access Network (VRAN).

15. The apparatus of claim 10, wherein the neural network is implemented in a radio access network (RAN) intelligent controller (RIC) module of at least one of an Open Radio Access Network (O-RAN) or a Virtual Radio Access Network (VRAN).

16. The apparatus of claim 10, computing the LLR comprises:
receiving at least one of a number of resource blocks (RBs), an operating frequency, a modulation and coding scheme (MCS), a number of independent streams, or a signal to interference and noise ratio (SINR), and
sequentially or parallel computing the LLR based on at least one of the number of RBs, the operating frequency, the MCS, the number of independent streams, Multiple Input Multiple Output (MIMO) details, a layer information associated with the wireless network, a layer information associated with a user equipment (UE), a sub-set of network parameters, or the SINR.

* * * * *